(No Model.)

J. SIEBEL.
HARNESS ATTACHMENT.

No. 321,652. Patented July 7, 1885.

WITNESSES:
John K. Deemer
C. Sedgwick

INVENTOR:
J. Siebel
BY Munn & Co.
ATTORNEYS.

UNITED STATES PATENT OFFICE.

JOHN SIEBEL, OF OSKALOOSA, IOWA.

HARNESS ATTACHMENT.

SPECIFICATION forming part of Letters Patent No. 321,652, dated July 7, 1885.

Application filed February 27, 1885. (No model.)

*To all whom it may concern:*

Be it known that I, JOHN SIEBEL, of Oskaloosa, in the county of Mahaska and State of Iowa, have invented a new and useful Improvement in Harness Attachments, of which the following is a full, clear, and exact description.

My invention relates to a device for attaching vehicles to the back-pads of harness; and the invention consists, principally, of an oscillating frame or yoke, to which the shafts or reach of the vehicle is attached.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
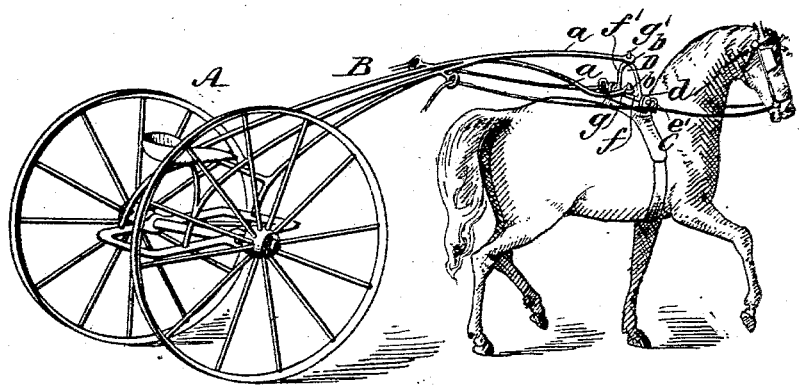
Figure 2:
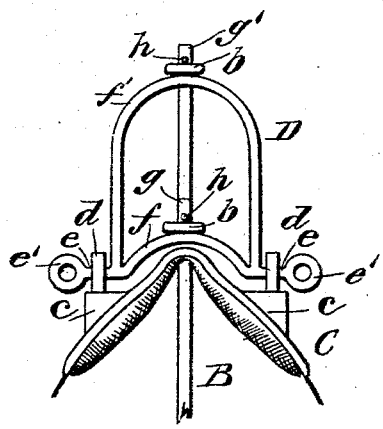

Figure 1 is a perspective view of a vehicle attached to a horse by my invention, and Fig. 2 is a front elevation of the harness back-pad having my invention applied thereto.

The vehicle A may be of any approved construction. Leading from the vehicle is the long upwardly-curved reach B, that extends from the vehicle over the back of the horse to the back-pad C of the harness. The forward end of the reach B is bifurcated to form the members $a\ a$. These are each formed with an eye, $b$. To the back-pad C are secured the blocks $c\ c$. Rising from these are the lugs $d\ d$, in which is journaled the frame or yoke D, the horizontal arms $e$ of the yoke extending through the lugs $d$, as shown clearly in Fig. 2. The said arms $e$ are formed with eyes $e'$ at their outer ends, that constitute guides for the lines of the harness, as shown in Fig. 1. The yoke or frame D is composed of the lower bow, $f$, and upper bow, $f'$. The bow $f$ is provided in its center with the stud $g$, and the bow $f'$ with the stud $g'$, and on these studs the eyes $b\ b$ of the reach B are placed for attaching the reach and vehicle to the horse. A pin or key, $h$, is placed through each of the studs $g\ g'$ for preventing accidental detachment of the reach from the harness. The studs $g\ g'$ constitute pivots to permit the horse to turn sidewise without cramping the reach B, and the arms $e\ e$ of the yoke D constitute horizontal pivots, so that the yoke may oscillate in the lugs $d\ d$, so that in passing over uneven ground the up and down movement of the horse and vehicle will not cramp the back-pad or reach nor interfere with the free movement of the horse.

Having thus described my invention, I claim as new and desire to secure by Letters Patent—

1. The combination, with the pad C, of the yoke D, pivoted in suitable bearings and provided with attaching devices for the reach B, substantially as described.

2. The yoke D, pivoted in bearings $d$, and the bows $f\ f'$ thereof provided with studs $g\ g'$, substantially as and for the purposes described.

JOHN SIEBEL.

Witnesses:
JOHN H. WANN,
JAS. T. MCNEILL.